(12) United States Patent
Kim et al.

(10) Patent No.: US 8,773,531 B2
(45) Date of Patent: Jul. 8, 2014

(54) THREE-DIMENSIONAL POINTING SENSING APPARATUS AND METHOD

(75) Inventors: SangHyun Kim, Yongin-si (KR); Hyong Euk Lee, Yongin-si (KR); Won-Chul Bang, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 406 days.

(21) Appl. No.: 12/662,553

(22) Filed: Apr. 22, 2010

(65) Prior Publication Data

US 2011/0069167 A1 Mar. 24, 2011

(30) Foreign Application Priority Data

Sep. 24, 2009 (KR) .......................... 10-2009-090383

(51) Int. Cl.
*H04N 7/18* (2006.01)
*G01S 11/12* (2006.01)
*G01S 5/00* (2006.01)

(52) U.S. Cl.
CPC ... *G01S 11/12* (2013.01); *G01S 5/00* (2013.01)
USPC ............................. 348/140; 348/142; 348/131

(58) Field of Classification Search
CPC .......... G01S 11/04; G01S 11/06; G01S 11/12
See application file for complete search history.

(56) References Cited

U.S. PATENT DOCUMENTS

| | | | | |
|---|---|---|---|---|
| 4,578,674 A * | 3/1986 | Baker et al. | .................... | 345/159 |
| 5,390,022 A * | 2/1995 | Ishizuka et al. | ............... | 356/499 |
| 5,499,098 A * | 3/1996 | Ogawa | .......................... | 356/621 |
| 5,867,146 A * | 2/1999 | Kim et al. | ..................... | 345/158 |
| 5,920,660 A * | 7/1999 | Goto | ............................. | 382/300 |
| 5,956,149 A * | 9/1999 | Suzuki et al. | ................. | 356/614 |
| 7,102,759 B2 * | 9/2006 | Yamamoto | .................... | 356/499 |
| 7,352,477 B2 * | 4/2008 | Seo | ................. | 356/614 |
| 7,414,596 B2 * | 8/2008 | Satoh et al. | ...................... | 345/8 |
| 7,474,418 B2 * | 1/2009 | Seko et al. | ..................... | 356/614 |
| 7,627,139 B2 * | 12/2009 | Marks et al. | .................. | 382/103 |
| 7,737,393 B2 * | 6/2010 | Fouquet et al. | ............... | 250/221 |
| 7,831,064 B2 * | 11/2010 | Ohta | ............................. | 382/106 |
| 8,072,614 B2 * | 12/2011 | Deliwala | ...................... | 356/614 |
| 8,154,513 B2 * | 4/2012 | Ohira et al. | .................... | 345/157 |
| 8,164,038 B2 * | 4/2012 | Chen et al. | ................. | 250/203.4 |
| 8,249,807 B1 * | 8/2012 | Barbeau et al. | .............. | 701/490 |
| 8,290,214 B2 * | 10/2012 | Kuo et al. | ..................... | 382/106 |
| 8,384,663 B2 * | 2/2013 | Fouquet et al. | ............... | 345/156 |

(Continued)

OTHER PUBLICATIONS

Suzuki et al. "A study on processing of position detection and data communication using illuminant devices and image sensor". (Oct. 2000) IECON 2000. 26th Annual Con. of the IEEE, vol. 2 p. 936-941.*

*Primary Examiner* — Sath V Perungavoor
*Assistant Examiner* — Matthew J Anderson
(74) *Attorney, Agent, or Firm* — Staas & Halsey LLP

(57) ABSTRACT

A three-dimensional (3D) pointing sensing apparatus may be provided. The 3D pointing sensing apparatus may include an image generation unit that may photograph a first light source and a second light source in a light emitting unit, and generate an image including an image of the first light source and an image of a second light source. Also, the 3D pointing sensing apparatus may include an orientation calculation unit that may calculate an orientation of the light emitting unit, using a size difference between the image of the first light source and the image of the second light source in the image.

20 Claims, 7 Drawing Sheets

(56) References Cited

U.S. PATENT DOCUMENTS

| | | | |
|---|---|---|---|
| 2002/0160840 A1* | 10/2002 | Morkris et al. | 463/51 |
| 2004/0135739 A1* | 7/2004 | Fukushima et al. | 345/6 |
| 2006/0215178 A1* | 9/2006 | Seko et al. | 356/614 |
| 2007/0070037 A1* | 3/2007 | Yoon | 345/156 |
| 2007/0081695 A1 | 4/2007 | Foxlin et al. | |
| 2007/0211022 A1* | 9/2007 | Boillot | 345/156 |
| 2007/0252832 A1* | 11/2007 | Ratai | 345/427 |
| 2007/0291278 A1* | 12/2007 | Seko | 356/498 |
| 2008/0015031 A1* | 1/2008 | Koizumi et al. | 463/43 |
| 2008/0024435 A1* | 1/2008 | Dohta | 345/156 |
| 2008/0117167 A1 | 5/2008 | Aonuma et al. | |
| 2008/0198129 A1* | 8/2008 | Cheng et al. | 345/156 |
| 2008/0239065 A1* | 10/2008 | Momonoi et al. | 348/49 |
| 2009/0268965 A1* | 10/2009 | Mita et al. | 382/190 |
| 2009/0278800 A1* | 11/2009 | Deliwala | 345/158 |
| 2010/0001950 A1* | 1/2010 | Fouquet et al. | 345/156 |
| 2010/0033427 A1* | 2/2010 | Marks et al. | 345/156 |
| 2010/0103099 A1* | 4/2010 | Lee | 345/158 |
| 2010/0103167 A1* | 4/2010 | Song et al. | 345/419 |
| 2010/0250189 A1* | 9/2010 | Brown | 702/181 |
| 2010/0253624 A1* | 10/2010 | Wilson | 345/158 |

* cited by examiner

THREE-DIMENSIONAL POINTING SENSING APPARATUS AND METHOD

CROSS-REFERENCE TO RELATED APPLICATIONS

This application claims the priority benefit of Korean Patent Application No. 10-2009-0090383, filed on Sep. 24, 2009, in the Korean Intellectual Property Office, the disclosure of which is incorporated herein by reference.

BACKGROUND

1. Field

Exemplary embodiments relate to a three-dimensional (3D) pointing sensing apparatus and method that may calculate a 3D position and orientation, and be applied to technologies such as motion tracking, human motion sensing, user interfacing, pointing sensing, and the like.

2. Description of the Related Art

A technology capable of calculating a position and an orientation of a device may be applied to a variety of fields.

For example, a calculated position and/or orientation may be used as user input information in a virtual world or a video game, and used as pointing input or control input to control an electronic device.

Also, a calculated position and/or orientation may be used for a user interface in a ubiquitous environment using motion tracking, human motion sensing, and the like. Information about a position of a device in a three-dimensional (3D) space may be represented as 3D position information, and information about an orientation of the device may be represented as orientation information.

Hereinafter, '3D pointing' may indicate that the device emits light such as infrared, and the like, to calculate the 3D position information and/or orientation information.

Although an inertial sensor and the like have been used to calculate 3D position information and/or orientation information, a manufacturing cost may be increased. When 3D position information and/or orientation information is calculated by sensing 3D pointing without a separate device such as an inertial sensor, an industrial applicability may be increased.

SUMMARY

According to exemplary embodiments, a three-dimensional (3D) pointing sensing apparatus and method may sense 3D pointing, and thereby may calculate a 3D position and orientation.

Also, according to exemplary embodiments, a 3D pointing sensing apparatus and method may accurately calculate a 3D position and a pointing direction of a device through infrared (IR) pointing and sensing without a separate device such as an inertial sensor.

Also, according to exemplary embodiments, a 3D pointing sensing apparatus and method may use an IR emitting unit of a remote control of an existing electronic device, for 3D pointing, and thereby may calculate a 3D position and orientation.

According to exemplary embodiments, there may be provided a three-dimensional (3D) pointing sensing apparatus, including: an image generation unit to photograph a first light source and a second light source in an light emitting unit, and to generate an image including an image of the first light source and an image of a second light source; and an orientation calculation unit to calculate an orientation of the light emitting unit, using a size difference between the image of the first light source and the image of the second light source in the image.

The orientation calculation unit may calculate the orientation of the light emitting unit, using the size difference, a position of the image of the first light source, and a position of the image of the second light source.

The 3D pointing sensing apparatus may further include a position calculation unit to calculate a position of the light emitting unit, using a position of the image of the first light source and a position of the image of the second light source in the image.

The position calculation unit may calculate the position of the light emitting unit, using the calculated orientation of the light emitting unit, the position of the image of the first light source, and the position of the image of the second light source.

The image may be an infrared (IR) image generated when the image generation unit photographs the first light source and the second light source.

The image generation unit may filter out light excluding an IR wavelength after photographing the first light source and the second light source to generate the IR image. When a light detection element of the image generation unit is configured to react against only IR, the operation of filtering out may be omitted.

The light emitting unit may be embodied in a remote control controlling an electronic device. That is, at least one of the first light source and the second light source may be an IR emitting unit of a remote control controlling an electronic device, and the IR emitting unit may encode each of an IR and a control signal using different codes and transmit the encoded IR and control signal, when transmitting the IR for calculating the orientation of the light emitting unit and when transmitting the control signal for controlling the electronic device.

The image generation unit may photograph and decode the IR emitting unit of the remote control, and generate the image when a decoding result is determined as the IR for calculating the orientation of the light emitting unit.

The orientation calculation unit may calculate the orientation of the light emitting unit, using the size difference between the image of the first light source and the image of the second light source, and an intensity difference between the image of the first light source and the image of the second light source.

According to other exemplary embodiments, there may be provided a 3D pointing sensing apparatus, including: an image generation unit to photograph a first light source and a second light source in an light emitting unit, and to generate an image including an image of the first light source and an image of a second light source; and an orientation calculation unit to calculate an orientation of the light emitting unit, using an intensity difference between the image of the first light source and the image of the second light source in the image.

The orientation calculation unit may calculate the orientation of the light emitting unit, using the intensity difference, a position of the image of the first light source, and a position of the image of the second light source.

The 3D pointing sensing apparatus may further include a position calculation unit to calculate a position of the light emitting unit, using a position of the image of the first light source and a position of the image of the second light source in the image.

According to exemplary embodiments, there may be provided a 3D pointing sensing method, including: photographing a first light source and a second light source in an light emitting unit, and generating an image including an image of the first light source and an image of a second light source; and calculating an orientation of the light emitting unit, using a size difference between the image of the first light source and the image of the second light source in the image.

Additional aspects of exemplary embodiments will be set forth in part in the description which follows and, in part, will be apparent from the description, or may be learned by practice of exemplary embodiments.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
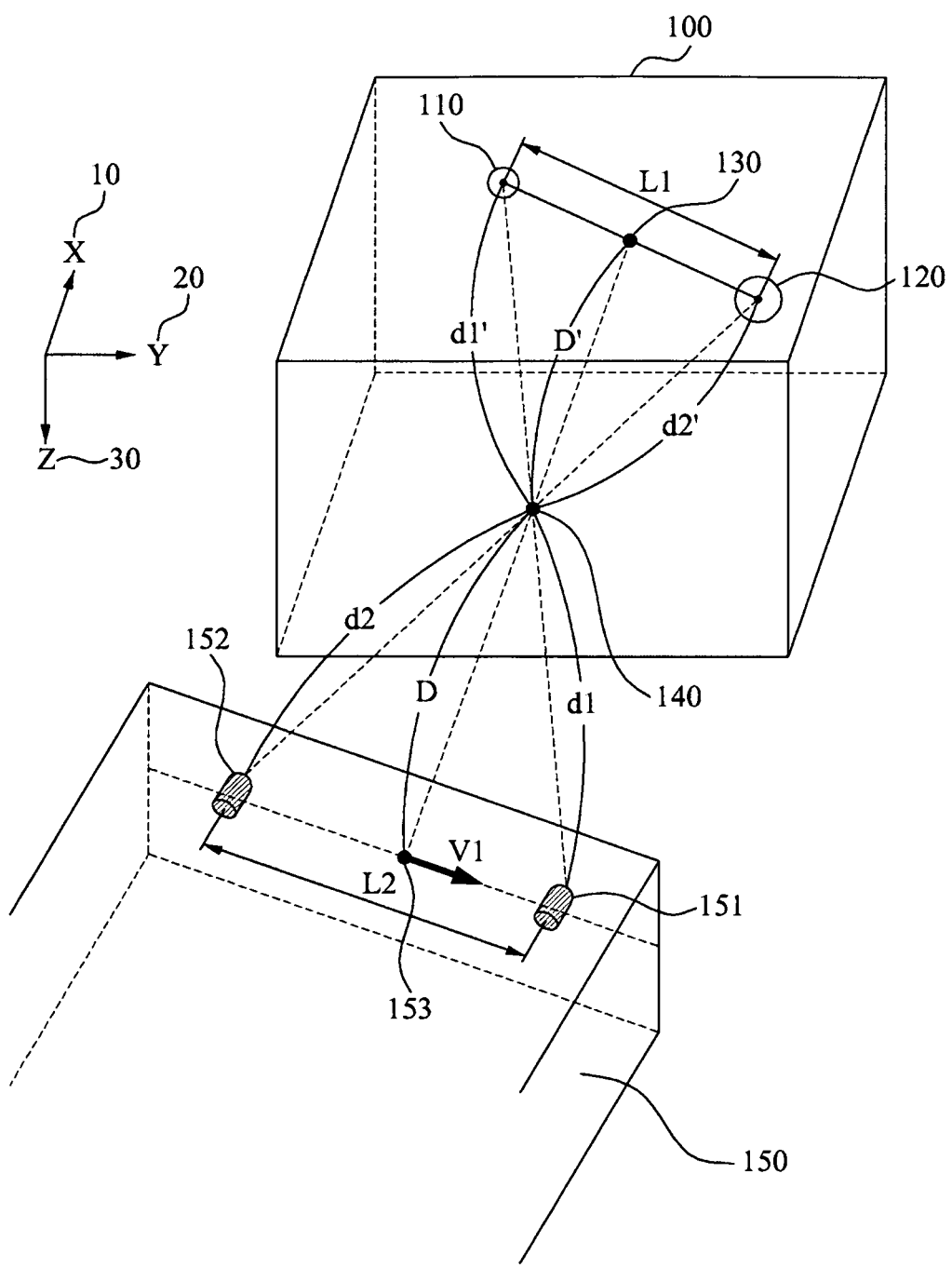
FIG. 1 illustrates a conceptual diagram of an example of capturing an image of a first light source and an image of a second light source from a light emitting unit in a three-dimensional (3D) pointing sensing apparatus according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates a conceptual diagram of an example of capturing an image of a first light source and an image of a second light source from a light emitting unit 150 in a three-dimensional (3D) pointing sensing apparatus 100 according to exemplary embodiments.

The 3D pointing sensing apparatus 100 may photograph a first light source 151 and a second light source 152 in a light emitting unit 150, and calculate a 3D position and orientation of the light emitting unit 150.

When a light, emitted from the first light source 151, and a light, emitted from the second light source 152, pass a hole 140, an image 110 of the first light source 151 and an image 120 of the second light source 152 may be captured. D' denotes a distance between the hole 140 and a middle point 130 of the distance between the image 110 and the image 120. Here, although the hole 140 is used to describe movement of the light from the first light source 151 and the second light source 152 and the forming of the images 110 and 120, a lens, an external side of a light receiving panel, and the like may be used.

The light, emitted from the first light source 151, and the light, emitted from the second light source 152, may be an infrared (IR) light. Hereinafter, although an IR light is used according to exemplary embodiments, a 3D pointing sensing apparatus and method may not be limited thereto. The light, emitted from the first light source 151, and/or the light, emitted from the second light source 152, may be a light having a predetermined wavelength.

According to exemplary embodiments, the light emitting unit 150 may be embodied by a remote control which transmits an IR control signal to control an existing electronic device. In this instance, at least one of the first light source 151 and the second light source 152 may be an IR Light Emitting Diode (LED) which is an IR emitting unit of a remote control of an electronic device.

When the at least one of the first light source 151 and the second light source 152 is the IR emitting unit, an IR for 3D pointing may be encoded using a different code when encoding a control signal to control the electronic device.

Also, in this instance, the 3D pointing sensing apparatus 100 may decode the received IR, and determine whether the received IR is a 3D pointing signal or the control signal of a general electronic device. The control signal may be a signal associated with power on/off, channel/volume control, and digit input. Only when the received IR is the 3D pointing signal may the received IR be used for calculation of 3D position/orientation.

Hereinafter, an operation of calculation of 3D position/orientation is described using a virtual axis X 10, a virtual axis Y 20, and a virtual axis Z 30.

According to exemplary embodiments, the 3D pointing sensing apparatus 100 may calculate a direction of a location vector V1 with respect to the first light source 151 and the second light source 152 using a size difference between the image 110 of the first light source 151 and the image 120 of the second light source 152. When the direction of the location vector V1 is calculated, the 3D orientation of the light emitting unit 150 may be calculated.

When the direction of the vector V1 is parallel to the axis Y 20, that is, when an angle between the vector V1 and a plane Y-Z is '0', a size of the image 110 of the first light source 151 and a size of the image 120 of the second light source 152 may be identical. However, when the angle is not '0', the size of the image 110 of the first light source 151 and the size of the image 120 of the second light source 152 may be different.

In FIG. 1, a distance d1 between the first light source 151 and the hole 140 may be greater than a distance d2 between the second light source 152 and the hole 140. Accordingly, the first light source 151 may be smaller than the second light source 152.

Thus, when comparing the size of the image 110 of the first light source 151 and the size of the image 120 of the second light source 152, the angle between the vector V1 and the plane Y-Z may be calculated.

An angle between the vector V1 and a plane X-Y may be calculated using a position of the image 110 of the first light source 151 and a position of the image 120 of the second light source 152. Accordingly, the direction of the vector V1 may be determined in a 3D space.

That is, the vector V1 may be determined, which may be used to determine the orientation of the light emitting unit 150.

The operation of calculating the 3D orientation has been described. Hereinafter, an operation of calculating the 3D position of the light emitting unit 150 is described in detail.

Referring to FIG. 1, as a distance D between the hole 140 and a middle point 153 of the first light source 151 and the second light source 152 in the light emitting unit 150 increases, it may be ascertained that a distance L1 between the image 110 of the first light source 151 and the image 120 of the second light source 152 decreases. Accordingly, as the distance D increases, the distance L1 may decrease.

However, a triangle among the first light source 151, the second light source 152, and the hole 140 may not be similar or symmetrical to a triangle among the image 110 of the first light source 151, the image 120 of the second light source 152, and the hole 140. Accordingly, the distance D may not be calculated when the distance L1 is measured.

That is, although a distance L2 between the first light source 151 and the second light source 152 is already known and the distance L1 is measured, additional information may be required to calculate the distance D. Here, the distance L2 may be a constant, and the additional information may be the direction of the vector V1.

An operation of calculating the direction of the vector V1, the distance D, and a position of the point 153 is described in greater detail with reference to FIG. 2.

Figure 2:
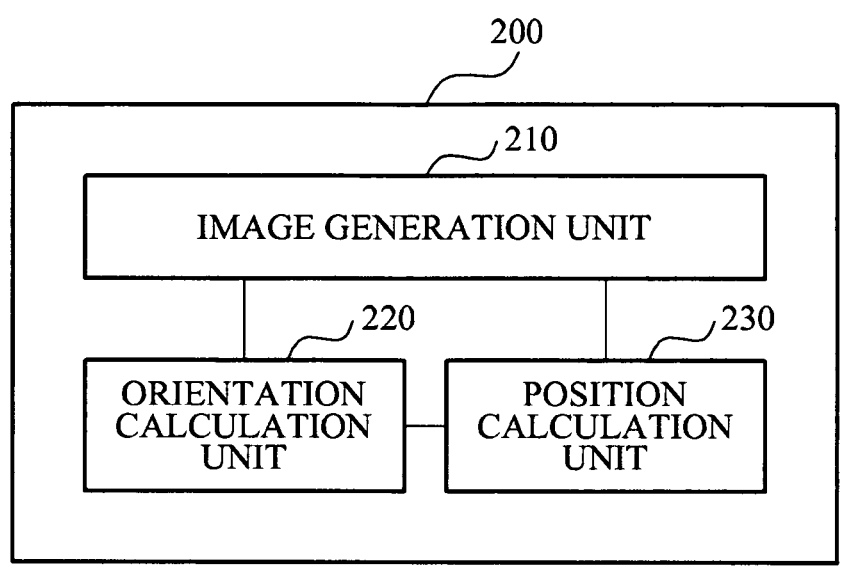
FIG. 2 illustrates a block diagram of a 3D pointing sensing apparatus according to exemplary embodiments.

FIG. 2 illustrates a block diagram of a 3D pointing sensing apparatus 200 according to exemplary embodiments.

The 3D pointing sensing apparatus 200 may include an image generation unit 210, an orientation calculation unit 220, and a position calculation unit 230.

The image generation unit 210 may generate an image including an image 110 of the first light source 151 and an image 120 of a second light source 152.

The generated image may be an IR image.

In this instance, the image generation unit 210 may generate the IR image using a light sensing element sensing an IR, or generate the IR image by photographing a first light source 151 and a second light source 152 using a general light sensing element such as a Complementary metal-oxide-semiconductor (CMOS) sensor, a Charge-Coupled Device (CCD) sensor, and the like, and filtering out a light element excluding an IR element.

According to exemplary embodiments, the image generation unit 210 may perform post-processing with respect to a first generated IR image or an image photographed before generating the IR image. Accordingly, a 3D position and orientation may be calculated more accurately.

The post-processing may include an image post-filtering operation, a noise reduction operation, and the like, that may be generally used in image processing.

Also, the orientation calculation unit 220 may calculate a direction of a vector V1 using an IR intensity difference and/or a size difference between the image 110 of the first light source 151 and the image 120 of the second light source 152. In this instance, the orientation calculation unit 220 may use a position of the image 110 of the first light source 151 and a position of the image 120 of the second light source 152.

An operation of calculating the direction of the vector V1 is described in detail with reference to FIGS. 3 through 5.

The position calculation unit 230 may calculate a position of the light emitting unit 150 in a 3D space using the calculated direction of the vector V1, the position of the image 110 of the first light source 151, and the position of the image 120 of the second light source 152.

An operation of calculating the position is described in detail with reference to FIG. 6.

Figure 3:
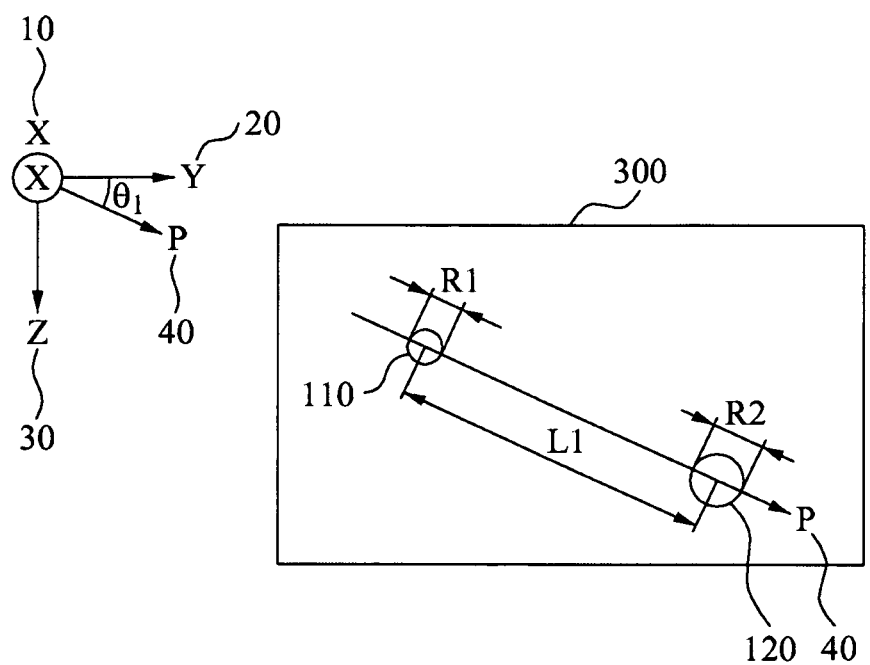
FIG. 3 illustrates a diagram of an image generated in the 3D pointing sensing apparatus of FIG. 2.

FIG. 3 illustrates a diagram of an image 300 generated in the 3D pointing sensing apparatus 200 of FIG. 2.

Referring to an image 300 generated by the image generation unit 210, an angle θ1 between the vector V1 and a plane X-Y may be calculated using a position of the image 110 of the first light source 151 and a position of the image 120 of the second light source 152.

When projecting the vector V1 to a plane Y-Z, the direction of the vector V1 may be identical to a direction of an axis P 40 passing the image 110 of the first light source 151 and the image 120 of the second light source 152. The axis P 40 may exist on the plane Y-Z. The angle θ1 may be an angle between the axis P 40 and the axis Y 20.

Also, when sizes of R1 and R2 are compared, an angle θ2 between the vector V1 and the plane Y-Z may be calculated. Here, R1 and R2 may indicate diameters of the image 110 and the image 120, respectively. As the light source is further away, the diameter may decrease. Accordingly, the angle θ2 may be calculated by comparing the sizes of R1 and R2. The direction of the vector V1 may be calculated when the orientation calculation unit 220 of FIG. 2 analyzes the image 300.

According to exemplary embodiments, the diameters of the image 110 and the image 120 may be compared to calculate the direction of the vector V1.

However, the direction of the vector V1 may also be calculated by comparing an intensity of an IR of the image 110 with an intensity of an IR of the image 120, which is described below with reference to FIG. 4. Also, the intensity of the IR of the image 110 and the image 120 may be represented as an intensity of an image.

Figure 4:
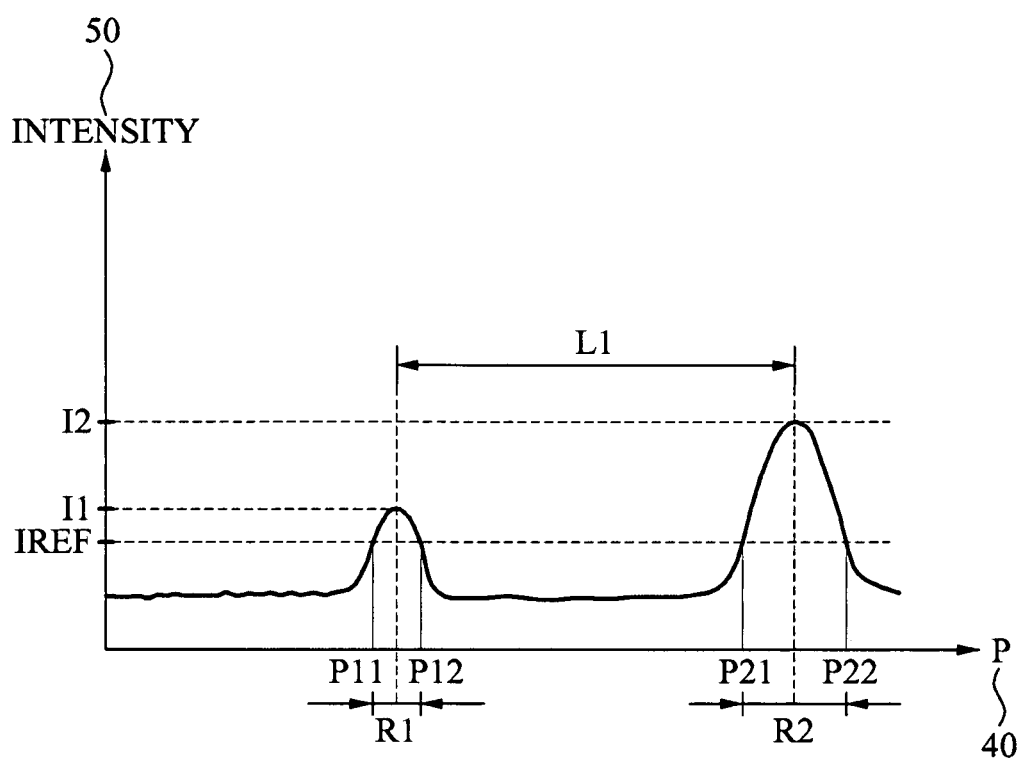
FIG. 4 illustrates an example of an analysis result of an intensity of an infrared (IR) light based on an axis P in the image of FIG. 3.

FIG. 4 illustrates an example of an analysis result of an intensity of an IR based on an axis P in the image of FIG. 3.

FIG. 4 illustrates a graph when an intensity of an IR is analyzed based on the axis P in the image 300. A horizontal axis of the graph may be the axis P 40, and a vertical axis may be an intensity axis 50.

The IR intensity, that is, an intensity of the IR image may rise between P11 and P12, drop and maintain the intensity between P12 and P21, and rise again between P21 and P22.

The intensity may be predetermined threshold values, Iref, at the points P11, P12, P21, and P22. A portion greater than the threshold value, Iref, may be determined as an image of a light source.

Accordingly, a distance between P12 and P11 may be regarded as the diameter R1, and a distance between P22 and P21 may be regarded as the diameter R2.

Also, a distance between peak values of intensity may be regarded as the distance L1 between the image 110 and the image 120.

According to exemplary embodiments, the angle θ2 may be calculated by comparing a peak value I1 with a peak value I2 as well as by comparing R1 and R2. It is well-known that the intensity of IR light is in inverse proportion to a square of distance. That is, as a light source is further away, the intensity may decrease. Accordingly, the angle θ2 may be calculated by comparing I1 and I2. The direction of the vector V1 may be calculated when the orientation calculation unit 220 analyzes the image 300.

Figure 5:
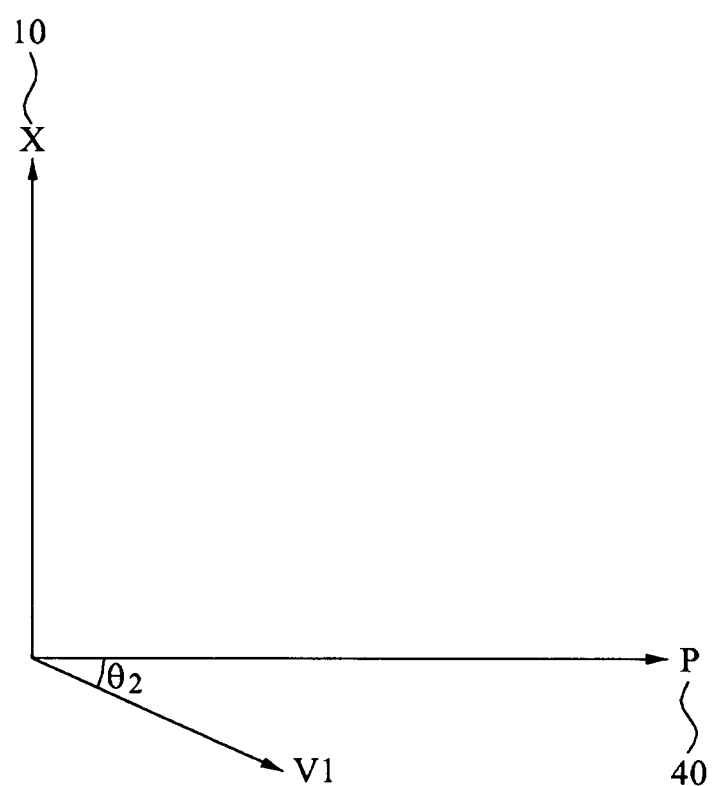
FIG. 5 illustrates an angle $\theta 2$, calculated using the image of FIG. 3, between the axis P and a vector V1.

FIG. 5 illustrates an angle θ2, calculated using the image of FIG. 3, between the axis P 40 and the vector V1.

The angle between the axis P 40 and the vector V1 may be identical to the angle θ2 between the vector V1 and the plane Y-Z.

The operation of calculating the direction of the vector V1 by analyzing the image 300 through the orientation calculation unit 220 has been described. When the direction of the vector V1 is calculated, a 3D orientation of the light emitting unit 150 may be obtained.

Hereinafter, an operation of calculating a 3D position of the point 153 by referring to the calculated direction of the vector V1 is described in detail.

Figure 6:
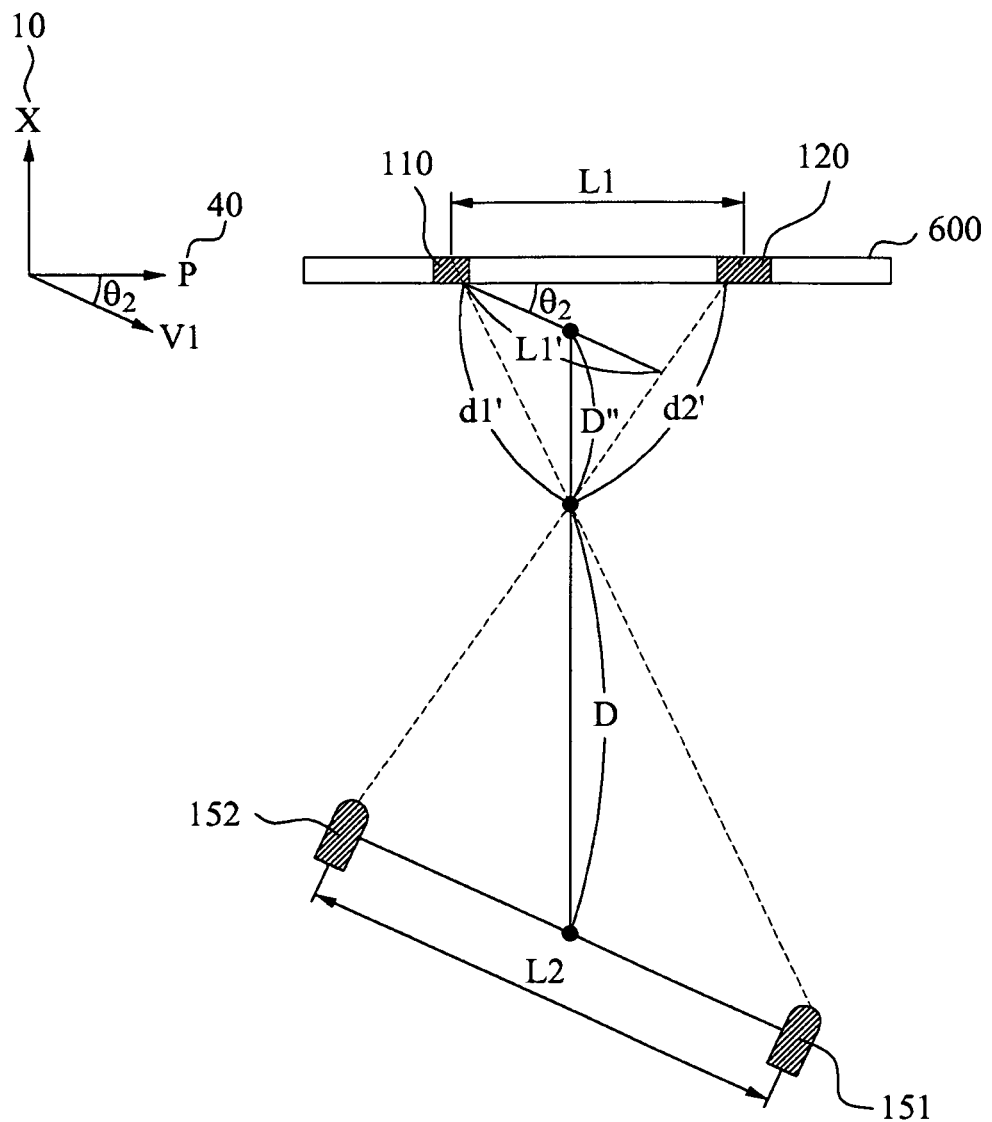
FIG. 6 illustrates a conceptual diagram of an operation of calculating a distance between a 3D pointing sensing apparatus and a light emitting unit using the angle $\theta 2$ of FIG. 5.

FIG. 6 illustrates a conceptual diagram of an operation of calculating a distance between a 3D pointing sensing apparatus and a light emitting unit using the angle θ2 of FIG. 5.

FIG. 6 is a top view of FIG. 1 based on a plane X-P. Since a section 600 may be parallel to the axis P 40, the image 110 of the first light source 151 and the image 120 of the second light source 152 may be on the section 600.

As described with reference to FIG. 1, the triangle among the first light source 151, the second light source 152, and the hole 140 may not be similar or symmetrical to the triangle among the image 110 of the first light source 151, the image 120 of the second light source 152, and the hole 140. Exceptionally, where the angle $\theta 2$ is '0', the two triangles may be similar or symmetrical to each other.

Since the position calculation unit 230 of FIG. 2 ascertains a position of the image 110 of the first light source 151, a position of the image 120 of the second light source 152, and a position of the hole 140, a distance d1' between the hole 140 and the image 110 may be calculated. Also, a distance d2' between the hole 140 and the image 120 may be calculated.

Also, the position calculation unit 230 may calculate a length L1' of a line between the image 110 and a line connecting the hole 140 and the image 120, using the angle $\theta 2$ calculated by the orientation calculation unit 220. Here, the line of the length L1' may be parallel to a line corresponding to L2 between the first light source 151 and the second light source 152.

In this instance, a triangle, which may be similar to and symmetrical to the triangle among the first light source 151, the second light source 152, and the hole 140, may be generated due to the line of the length L1'.

Also, the position calculation unit 230 may calculate a distance D" between the hole 140 and a middle value of the line of the length L1'.

$$L1':L2=D":D \quad \text{[Equation 1]}$$

Also, D, which is a distance between the hole 140 and the point 153 of the line L2, may be calculated based on a result of Equation 1 according to Equation 2.

$$D=(D"*L2)/L1' \quad \text{[Equation 2]}$$

Since L2 is a constant and D" and L1' have been calculated above, the position calculation unit 230 may calculate the distance D according to Equation 2.

Since a 3D position of the point 153 as well as the distance D may be accurately calculated, a position of the light emitting unit 150 may be calculated.

That is, the 3D pointing sensing apparatus 200 may calculate the 3D position and orientation of the light emitting unit 150.

Accordingly, pointing of two IR LEDs may be sensed without a separate inertial sensor, and the 3D position and orientation of the light emitting unit 150 may be sensed. Thus, a manufacturing cost may be reduced.

Figure 7:
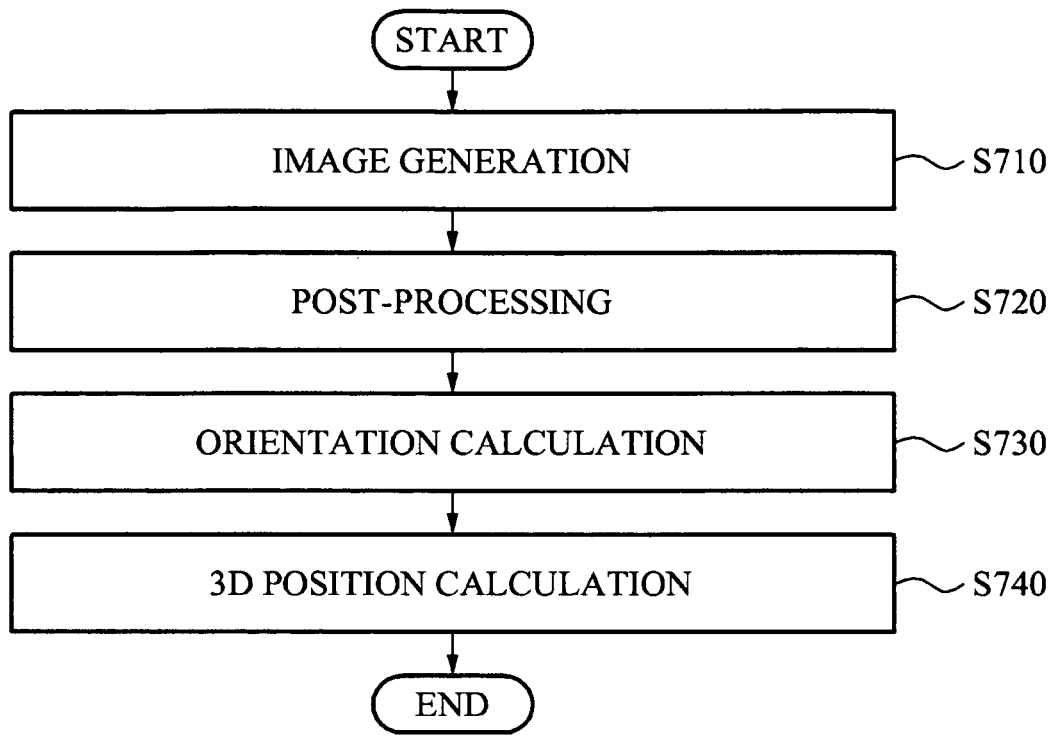
FIG. 7 illustrates a flowchart of a 3D pointing sensing method according to exemplary embodiments.

FIG. 7 illustrates a flowchart of a 3D pointing sensing method according to exemplary embodiments.

In operation S710, an IR image may be generated by an image generation unit 210.

The IR image may be generated by photographing a first light source 151 and a second light source 152, and filtering out light excluding an IR element when required.

In operation S720, a post-processing operation may be performed. The post-processing may include an image post-filtering, a noise reduction operation, and the like, that may be generally used in image processing.

In operation S730, an angle $\theta 1$ and an angle $\theta 2$ may be calculated by an orientation calculation unit 220, and thus a direction of a vector V1 may be calculated.

An operation of calculating the direction of the vector V1 has been described above with reference to FIGS. 3 through 5.

In operation S740, a 3D position of a light emitting unit 150 may be calculated using the calculated direction of the vector V1 by a position calculation unit 230.

An operation of calculating the position has been described above with reference to FIG. 6.

The operation of calculating a 3D position and orientation of the light emitting unit 150 through sensing of 3D pointing has been described above. Here, it has been described that at least one of the first light source 151 and the second light source 152 is embodied as an IR LED of a remote control of a general electronic device.

In this instance, it also has been described that whether an IR light, emitted from the IR LED, is a signal for tracking the 3D position and orientation, or a signal to control a general electronic device may be determined by a coding type used in an encoding/decoding operation.

The 3D pointing sensing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A three-dimensional (3D) pointing sensing apparatus, comprising:
    an image generation unit to photograph a first light source and a second light source in a light emitting unit, and to generate an image including an image of the first light source and an image of a second light source, wherein light emitted from the first light source and light emitted from the second light source pass through a hole of the three-dimensional (3D) pointing sensing apparatus; and
    an orientation calculation unit to calculate an orientation of a vector between the first light source and the second light source of the light emitting unit, using a size difference between the image of the first light source and the image of the second light source in the image to calculate a first angle of the vector with respect to a first two dimensional plane of the image generation unit using at least one processing device, wherein the orientation calculation unit calculates the orientation of the vector between the first light source and the second light source based in part on the first angle of the vector, wherein the orientation calculation unit calculates the orientation of the vector between the first light source and the second light source of the light emitting unit, using a position of the image of the first light source and a position of the image of the second light source to calculate a second angle of the vector with respect to a second two dimensional plane of the image generation unit, and wherein the orientation calculation unit calculates the orientation of the vector between the first light source and the second light source based on the first angle of the vector and the second angle of the vector.

2. The 3D pointing sensing apparatus of claim 1, further comprising:
a position calculation unit to calculate a position of the light emitting unit, using a position of the image of the first light source and a position of the image of the second light source in the image.

3. The 3D pointing sensing apparatus of claim 2, wherein the position calculation unit calculates the position of the light emitting unit, using the calculated orientation of the light emitting unit, the position of the image of the first light source, and the position of the image of the second light source.

4. The 3D pointing sensing apparatus of claim 1, wherein the image is an infrared (IR) image generated when the image generation unit photographs the first light source and the second light source.

5. The 3D pointing sensing apparatus of claim 4, wherein the image generation unit filters out light excluding an IR wavelength after photographing the first light source and the second light source to generate the IR image.

6. The 3D pointing sensing apparatus of claim 4, wherein at least one of the first light source and the second light source is an IR emitting unit of a remote control which controls an electronic device,
the IR emitting unit encodes each of an IR light and a control signal using different codes and transmits the encoded IR light and control signal, when transmitting the IR light for calculating the orientation of the light emitting unit and when transmitting the control signal for controlling the electronic device, and
the image generation unit photographs and decodes the IR light from the IR emitting unit of the remote control, and generates the image when a decoding result is determined as the IR light for calculating the orientation of the light emitting unit.

7. The 3D pointing sensing apparatus of claim 1, wherein the orientation calculation unit calculates the orientation of the light emitting unit, using the size difference between the image of the first light source and the image of the second light source, and an intensity difference between the image of the first light source and the image of the second light source.

8. A three-dimensional (3D) pointing sensing apparatus, comprising:
an image generation unit to photograph a first light source and a second light source in a light emitting unit, and to generate an image including an image of the first light source and an image of a second light source, wherein light emitted from the first light source and light emitted from the second light source pass through a hole of the three-dimensional (3D) pointing apparatus; and an orientation calculation unit to calculate an orientation of a vector between the first light source and the second light source of the light emitting unit, using an intensity difference between the image of the first light source and the image of the second light source in the image to calculate a first angle of the vector with respect to a first two dimensional plane of the image generation unit using at least one processing device, wherein the orientation calculation unit calculates the orientation of the vector between the first light source and the second light source based in part on the first angle of the vector, wherein the orientation calculation unit calculates the orientation of the vector between the first light source and the second light source of the light emitting unit, using a position of the image of the first light source and a position of the image of the second light source to calculate a second angle of the vector with respect to a second two dimensional plane of the image generation unit, and wherein the orientation calculation unit calculates the orientation of the vector between the first light source and the second light source based on the first angle of the vector and the second angle of the vector.

9. The 3D pointing sensing apparatus of claim 8, further comprising:
a position calculation unit to calculate a position of the light emitting unit, using a position of the image of the first light source and a position of the image of the second light source in the image.

10. The 3D pointing sensing apparatus of claim 9, wherein the position calculation unit calculates the position of the light emitting unit, using the calculated orientation of the light emitting unit, the position of the image of the first light source, and the position of the image of the second light source.

11. The 3D pointing sensing apparatus of claim 8, wherein the image is an infrared (IR) image generated when the image generation unit photographs the first light source and the second light source.

12. A three-dimensional (3D) pointing sensing method, comprising:
photographing a first light source and a second light source in a light emitting unit, and generating an image including an image of the first light source and an image of a second light source, wherein light emitted from the first light source and light emitted from the second light source pass through a hole of a three-dimensional (3D) pointing apparatus;
calculating an orientation of a vector between the first light source and the second light source; and
calculating an orientation of the light emitting unit, using a size difference between the image of the first light source and the image of the second light source in the image to calculate a first angle of the vector with respect to a first two dimensional plane of the image generation unit using at least one processing device,
wherein the calculating of the orientation of the light emitting unit includes calculating the orientation of the vector between the first light source and the second light source based in part on the first angle of the vector,
wherein the calculating of the orientation of the light emitting unit includes calculating the orientation of the vector between the first light source and the second light source of the light emitting unit, using a position of the image of the first light source and a position of the image of the second light source to calculate a second angle of the vector with respect to a second two dimensional plane of the image generation unit, and wherein the calculating of the orientation of the light emitting unit includes calculating the orientation of the vector between the first light source and the second light source based on the first angle of the vector and the second angle of the vector.

13. The 3D pointing sensing method of claim 12, wherein the calculating calculates the orientation of the light emitting unit, using the size difference, a position of the image of the first light source, and a position of the image of the second light source.

14. The 3D pointing sensing method of claim 12, further comprising:

calculating a position of the light emitting unit, using a position of the image of the first light source and a position of the image of the second light source in the image.

15. The 3D pointing sensing method of claim 14, wherein the calculating of the position calculates the position of the light emitting unit, using the calculated orientation of the light emitting unit, the position of the image of the first light source, and the position of the image of the second light source.

16. The 3D pointing sensing method of claim 12, wherein the generating of the image comprises:

photographing the first light source and the second light source to generate the image; and filtering out light excluding an infrared (IR) wavelength, and generating the IR image from the image.

17. The 3D pointing sensing method of claim 16, wherein at least one of the first light source and the second light source is an infrared (IR) emitting unit of a remote control controlling an electronic device, the IR emitting unit encodes each of an IR light and a control signal using different codes and transmits the encoded IR and control signal, when transmitting the IR light for calculating the orientation of the light emitting unit and when transmitting the control signal for controlling the electronic device, and the generating of the image comprises:

photographing the IR light from the IR emitting unit of the remote control, and recognizing an IR element; and decoding the recognized IR element, and generating the image when a decoding result is determined as the IR light for calculating the orientation of the light emitting unit.

18. A non-transitory computer-readable recording medium encoded with instructions causing at least one processing device to perform a three-dimensional (3D) pointing sensing method comprising:

photographing a first light source and a second light source in an light emitting unit, and generating an image including an image of the first light source and an image of a second light source, wherein light emitted from the first light source and light emitted from the second light source pass through a hole of a three-dimensional (3D) pointing apparatus;

calculating an orientation of a vector between the first light source and the second light source; and calculating an orientation of the light emitting unit, using a size difference between the image of the first light source and the image of the second light source in the image to calculate a first angle of the vector with respect to a first two dimensional plane of the image generation unit using at least one processing device, wherein the calculating of the orientation of the light emitting unit includes calculating the orientation of the vector between the first light source and the second light source based in part on the first angle of the vector, wherein the calculating of the orientation of the light emitting unit includes calculating the orientation of the vector between the first light source and the second light source of the light emitting unit, using a position of the image of the first light source and a position of the image of the second light source to calculate a second angle of the vector with respect to a second two dimensional plane of the image generation unit, and wherein the calculating of the orientation of the light emitting unit includes calculating the orientation of the vector between the first light source and the second light source based on the first angle of the vector and the second angle of the vector.

19. The 3D pointing sensing apparatus of claim 1, further comprising:

a position calculation unit to calculate a distance from the hole of the 3-D pointing sensing apparatus to a middle point between the first light source and the second light source of the light emitting unit based on the position of the image of the first light source, the position of the image of the second light source, a known fixed distance between the first light source and the second light source, and one of the first angle of the vector and the second angle of the vector.

20. The 3D pointing sensing apparatus of claim 1, wherein the first two dimensional plane of the image generation unit is one of the X-Y plane of the image generation unit, X-Z plane of the image generation unit, and the Y-Z plane of the image generation unit, wherein the second two dimensional plane of the image generation unit is one of the X-Y plane of the image generation unit, X-Z plane of the image generation unit, and the Y-Z plane of the image generation unit, and wherein the second two dimensional plane of the image generation unit is a different plane than the first two dimensional plane of the image generation unit.

* * * * *